W. Riddle.
Cotton Bale Tie.
No. 93,555. Patented Aug. 10, 1869.
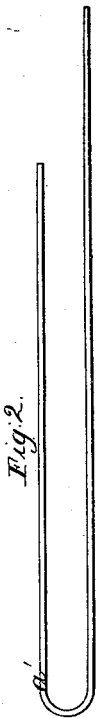
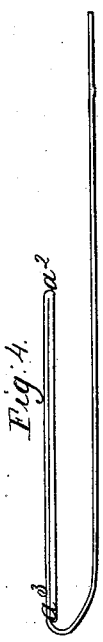
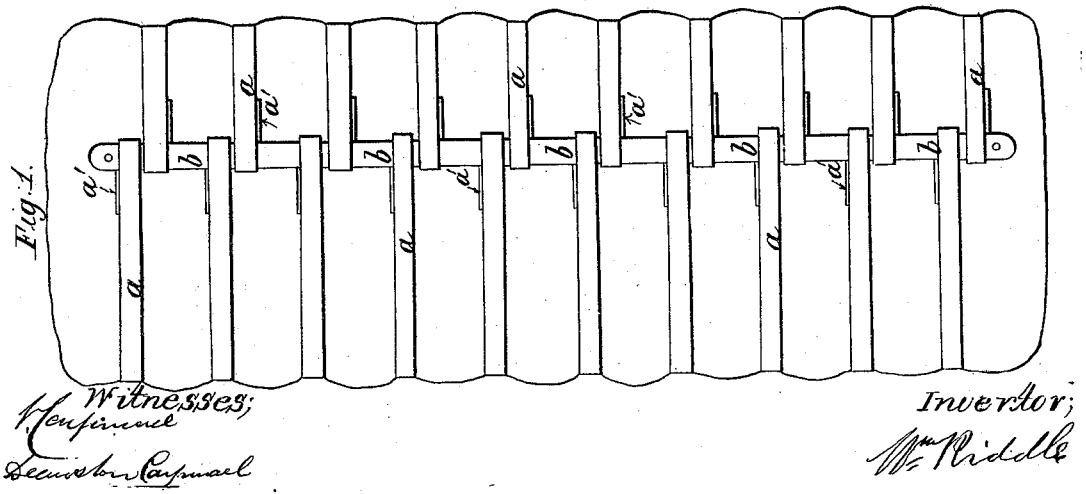

United States Patent Office.

WILLIAM RIDDLE, OF 10 LARKHALL LANE, ENGLAND.

Letters Patent No. 93,555, dated August 10, 1869.

PACKING-DEVICE.

The Schedule referred to in these Letters Patent and making part of the same.

To all to whom it may concern:

Be it known that I, WILLIAM RIDDLE, of 10 Larkhall Lane, in the county of Surrey, England, a subject of the Queen of Great Britain, have invented or discovered new and useful "Improvements in Packing or Forming Bales of Cotton and other Fibrous Material;" and I, the said WILLIAM RIDDLE, do hereby declare the nature of the said invention, and in what manner the same is to be performed, to be particularly described and ascertained in and by the following statement thereof; that is to say—

For this purpose, I employ bands of hoop-iron or metal, bent over at their ends so as to form hooks, or loops. These are passed around the unbound bale while it is held under pressure in the press in which it is packed.

The length of the bands is such that their hooked ends may pass each other a short distance, and lie side by side on the bale, the bent ends of the hoops being inward or against the surface of the bale, which is essential.

A straight piece of hoop, or flat bar-iron or other rigid material, which I call a spear, is passed through the bent ends of the hoops as they lie side by side. Thus the ends of the bands are secured and rendered firm on the spear, as soon as the pressure on the bale is removed by the expanding of the bale.

In order that my said invention may be understood and carried into effect, I will proceed to describe the drawings hereunto annexed.

Description of the Drawings.

Figure 1 is an elevation side view of a bale formed according to my invention.

$a\ a$ are the metal bands, which are passed around the cotton or other fibrous substance, while it is held under compression in the packing-press, the material to be packed having usually cloths above and below it in the press.

$a^1\ a^1$ are the hooked, or looped ends of the bands, side by side.

$b$ is the spear, or hoop, (iron or other material,) passed through the bent ends, hoops, or loops.

Figures 2 and 3 represent full-size (or thereabout) forms of hook or looped ends $a^1\ a^1$.

Figure 4 represents the end of a band, first folded down, as at $a^2$, and then in the form $a^3$, which is best done red-hot, over a die, or gauge—a large number being done at a time previous to packing.

Figures 5 and 6 are forms intended to be used when the ends of the bands are first made red-hot.

The hoop-ends may be thus bent by any suitable tool, as well understood by engineers.

The spear I usually make of such a length as to take all the hoops, or loops $a^1$ from end to end of the bale; but it may be in two or more lengths.

My invention enables me to use flat bands, or hoops for securing bales without slitting their ends or overlapping them by a clasp or buckle.

What, therefore, I claim as my invention, and desire to secure by Letters Patent, is—

The combination of the flat band, having its ends formed into loops, without slitting, with a spear inserted through the loops, as described.

WILLIAM RIDDLE.

Witnesses:
G. F. WARREN, } Both of No. 17 Gracechurch
T. S. WARNER, } Street, London.